(12) United States Patent
Partington et al.

(10) Patent No.: US 9,397,326 B2
(45) Date of Patent: Jul. 19, 2016

(54) BATTERY

(75) Inventors: Kenneth Michael Partington, Lancashire (GB); Gerard Chevalier, F-Arras (FR)

(73) Assignee: Enersys Limited, Bristol (GB)

( * ) Notice: Subject to any disclaimer, the term of this patent is extended or adjusted under 35 U.S.C. 154(b) by 2259 days.

(21) Appl. No.: 11/597,066

(22) PCT Filed: May 25, 2005

(86) PCT No.: PCT/GB2005/002071
§ 371 (c)(1),
(2), (4) Date: Feb. 19, 2008

(87) PCT Pub. No.: WO2005/119811
PCT Pub. Date: Dec. 15, 2005

(65) Prior Publication Data
US 2008/0145754 A1  Jun. 19, 2008

(30) Foreign Application Priority Data
Jun. 2, 2004 (GB) .................................. 0412288.3

(51) Int. Cl.
*H01M 2/00* (2006.01)
*H01M 2/12* (2006.01)
*H01M 2/08* (2006.01)
*H01M 10/12* (2006.01)

(52) U.S. Cl.
CPC .............. *H01M 2/1252* (2013.01); *H01M 2/08* (2013.01); *H01M 10/12* (2013.01); *Y10T 29/4911* (2015.01)

(58) Field of Classification Search
CPC ..... H01M 2/08; H01M 10/12; H01M 2/1252; Y01T 29/4911
See application file for complete search history.

(56) References Cited

U.S. PATENT DOCUMENTS

| | | | | |
|---|---|---|---|---|
| 3,436,272 | A | * | 4/1969 | Gelting .......................... 429/457 |
| 3,904,441 | A | * | 9/1975 | Badger ........................... 429/86 |
| 4,252,870 | A | | 2/1981 | Nemeth |
| 4,278,742 | A | | 7/1981 | Oxenreider et al. |
| 5,856,037 | A | | 1/1999 | Casale et al. |
| 6,159,628 | A | | 12/2000 | Grasso et al. |
| 6,736,406 | B1 | * | 5/2004 | Provencher ................... 277/628 |
| 2003/0003343 | A1 | | 1/2003 | Cisar et al. |
| 2003/0215698 | A1 | | 11/2003 | Schulte-Ladbeck |

FOREIGN PATENT DOCUMENTS

| | | |
|---|---|---|
| JP | 11 007925 A | 1/1999 |
| JP | 2001266819 A | 9/2001 |
| WO | WO0223656 A | 3/2002 |

OTHER PUBLICATIONS

International Search Report and Written Opinion for PCT/GB2005/002071; date of mailing Sep. 9, 2005.

* cited by examiner

*Primary Examiner* — Mark F Huff
*Assistant Examiner* — Monique Wills
(74) *Attorney, Agent, or Firm* — Myers Bigel & Sibley, PA

(57) ABSTRACT

The invention relates to a battery (1) comprising a casing having one or more gas vents (3) and a manifold (4) arranged to collect gas emerging from the gas vents wherein the manifold is fixed to the casing using a double sided adhesive gasket (6).

15 Claims, 1 Drawing Sheet

BATTERY

RELATED APPLICATIONS

This application claims priority from PCT Application No. GB2005/002071, filed May 25, 2005, which claims priority from Great Britain Application No. 0412288.3, filed Jun. 2, 2004, the disclosures of each of which are hereby incorporated herein by reference in their entireties. The above-identified PCT application was originally published in the English language and has International Publication No. WO 2005/119811.

FIELD OF THE INVENTION

The invention relates to a battery, in particular, but not exclusively, to a lead acid battery.

BACKGROUND OF THE INVENTION

Under certain conditions sealed lead acid batteries can emit small quantities of oxygen and hydrogen gases. When such lead acid batteries are installed in sealed electronic cabinets it is often considered desirable to provide a means of collecting these gases and venting them to the outside of the cabinet.

The typical method of collecting these gases is to fit a manifold onto the battery lid that covers the battery vents. This manifold has at least one spigot to which a plastic tube is fitted. This tube is then run to the outside of the cabinet or to another means of evacuation.

The manifold is secured to the battery lid by a gas tight method—typically either an adhesive or an o-ring. Using an adhesive allows the manifold to be fitted to a battery by the manufacturer only as and when required by the end, lcu@stomer but is a labour intensive solution. Using an o-ring typically requires the manifold to be part of the standard battery build and so involves additional cost on the standard battery regardless of whether or not a manifold is required.

SUMMARY OF THE INVENTION

The invention provides a battery comprising a casing having one or more gas vents, a manifold arranged to collect gas emerging from the vents and a double-sided adhesive gasket arranged between the manifold and the casing.

The use of a double-sided adhesive gasket gives the manufacturer the flexibility to fit a manifold to the battery only when the manifold is required by the end user and avoids the messy, labour intensive process of applying a liquid adhesive by hand to the mating surfaces of the casing and manifold. Furthermore, the gasket can be applied to the manifold to form an assembly which can then be held in stock until required by the manufacturer or even sold as a separate item to be fitted to a battery by the end user.

The gasket has the fumctions of fixing the manifold in place and sealing the joint between the manifold and the battery casing.

The material from which the gasket is made will typically be a tape or sheet material having two adhesive surfaces. Such tape materials are typically supplied having release layers on one or both sides for ease of handling. The gasket material should be such that it can be cut to the required shape and should adhere strongly enough so that the battery manifold is firmly held in position. The gasket material should also preferably be resistant to attack by the acid electrolyte of the battery, to prevent corrosion should leakage of that electrolyte occur. The gasket material should also be impervious to the vented gases, in order to prevent leakage through the manifold/casing joint. A wide range of suitable double-sided adhesive materials are commercially available, for example, the double coated acrylic foam tapes sold by 3 M under the trade name VHB. One preferred material is VHB 4943.

In one method of manufacture of the battery, the double-sided adhesive material is cut to the required shape, a release layer is removed (if necessary) and the exposed adhesive surface is applied to the manifold. The remaining release layer is then stripped away and the manifold assembly is pressed into position on the battery.

The double-sided adhesive gasket may be of any suitable thickness, for example, the gasket may have a thickness in the range of 0.5 mm to 5 mm, preferably in the range of 0.5 mm to 3 mm.

The double-sided adhesive gasket is preferably resilient and can adapt to minor imperfections in the mating surfaces, thereby providing a good seal. For example, the gasket material may be a foam material.

In one embodiment, the shape of the gasket is such that it fits between only the peripheral regions of the manifold and the casing of the battery, with the central region of the manifold being clear of gasket material. More preferably, however, the gasket extends across more than 50%, preferably more than 80% of the interfacial area between the casing and the manifold. The gasket should include at least one perforation or gas permeable region for passage of the vented gases from the vents into the body of the manifold. Preferably, the gasket includes at least one perforation for each gas vent, those perforations aligning, in use, with the gas vents.

Advantageously, the manifold includes members which contact non-peripheral regions of the double-sided adhesive gasket. Those members, which may be of any suitable shape, such as ribs or pillars, increase the area of bonding between the manifold and the gasket and thereby enhance the strength of the joint between the manifold and the casing. Preferably, the underside of the manifold is ribbed.

Advantageously, the double-sided adhesive gasket does not extend outwardly of the manifold to any significant degree in order to avoid waste of the gasket material and to prevent unwanted dirt becoming stuck to exposed parts of the gasket.

Preferably, the battery comprises a lid and the gas vents are located in the lid with the manifold being on the upper side of the lid.

The battery may have one gas vent per cell. The battery may be a 6-cell battery having six gas vents.

In a preferred embodiment, the manifold and gasket are substantially rectangular.

Typically, the manifold will comprise one or more spigots to which tubing may be attached. In one embodiment, the manifold has a single spigot: In another embodiment the manifold has two spigots. Where the manifold is substantially rectangular, the spigot or spigots will preferably be located on one or both of the short sides of the manifold, so that in the assembled battery the spigot or spigots point toward one of the ends of the battery (preferably the end having the terminals). Where the manifold has two spigots, they may be on the same side of the manifold or they may be on opposite sides of the manifold.

The invention is applicable to any battery which produces a gas. The invention is particularly suitable for lead acid batteries, especially sealed lead acid batteries.

In a second aspect, the invention provides a manifold assembly for a lead acid battery including a manifold and a double-sided adhesive gasket, one side of the double-sided adhesive gasket being adhered to the manifold and the other side of the double-sided adhesive gasket being covered with a release layer, the arrangement being such that the manifold may be fixed in position on a battery casing by removing the release layer and pressing the manifold onto the casing.

In a third aspect, the invention provides a method of making a battery comprising the steps of:
i) providing a battery having a casing including one or more gas vents;
ii) providing a manifold for leading gas away from the gas vents; and
iii) fixing the manifold to the casing using a double-sided adhesive gasket.

Advantageously, the gasket is first applied to the manifold to make a manifold assembly. The release layer is then removed and the manifold assembly is applied to the casing.

The method may also include the step of preparing the gasket by cutting a double-sided adhesive material to the desired shape.

BRIEF DESCRIPTION OF THE DRAWINGS

Embodiments of the invention will now be described for the purposes of illustration only and with reference to the Figures, in which.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
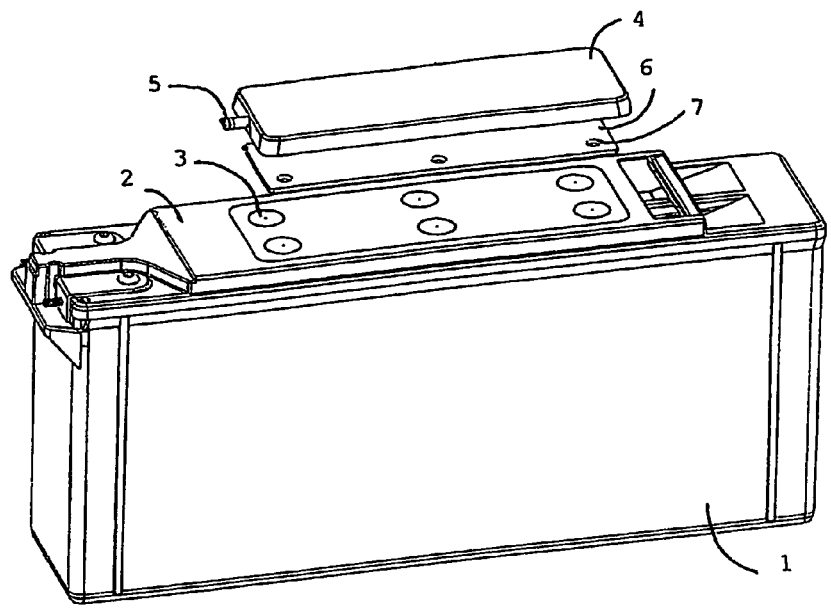
FIG. 1 shows an exploded view of a lead acid battery, gasket and manifold.

FIG. 1 shows a lead acid battery 1 having a lid 2 which includes six gas vents 3. Rectangular manifold 4 is arranged to cover the gas vents 3 and to collect the gas from those gas vents. The collected gas leaves the manifold 4 via spigot 5 to which, in use, a flexible tube (not shown) is attached.

Located between manifold 4 and the lid 2 is gasket 6. The gasket 6 is a generally rectangular piece of double-sided adhesive foam, having six holes 7 (only three are visible in FIG. 1), each hole being in alignment with one of the vents 3. As can be seen from FIG. 1, the gasket 6 extends over substantially all of the area under the manifold 4 apart from the area of the holes above the gas vents.

Figure 2:
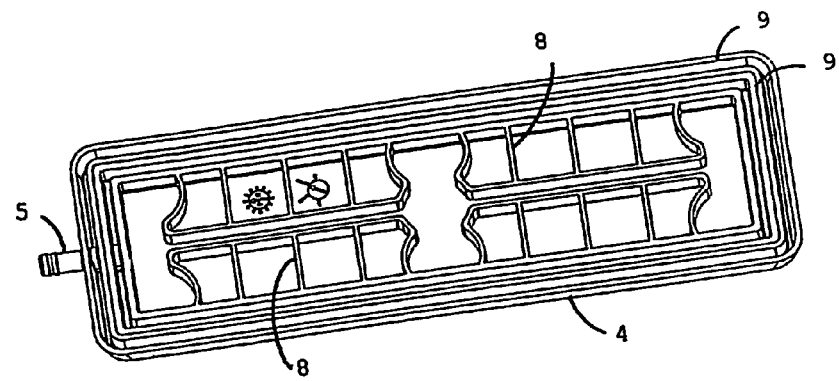
FIG. 2 shows the underside of the manifold shown in FIG. 1.

FIG. 2 shows the underside of the manifold 4. The manifold 4 has internal ribs 8 which adhere to the central areas of the areas of the gasket 6.

In manufacture of the battery, the gasket 6 is cut to the required shape from a double-sided acrylic foam tape. One release layer is then stripped away and the adhesive surface is applied to the underside of the manifold 4. The second release coating is then stripped away and the second adhesive surface is applied to the lid 2 such that the holes 7 align with the gas vents 3.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore,. it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A battery comprising a casing having one or more gas vents, a manifold arranged to collect gas emerging from the vents, and a double-sided adhesive gasket arranged between the manifold and the casing forming a seal therebetween, wherein the manifold includes a spigot configured to enable gas in the manifold to be expelled therefrom.

2. A battery as claimed in claim 1 in which the casing comprises a lid including the gas vents and the manifold is on the upper side of the lid.

3. A battery as claimed in claim 1 in which the double-sided adhesive gasket has a thickness in the range of from 0.5 mm to 5 mm.

4. A battery as claimed in claim 1 in which the double-sided adhesive gasket is of resilient material.

5. A battery as claimed in claim 1 in which the double-sided adhesive gasket is of a foam material.

6. A battery as claimed in claim 1 in which the double-sided adhesive gasket extends across more than 50% of the interfacial area between the casing and the manifold.

7. A battery as claimed in claim 1 in which the manifold includes members which contact non-peripheral regions of the double-sided adhesive gasket.

8. A battery as claimed in claim 1 in which the double-sided adhesive gasket does not extend beyond the manifold.

9. A battery as claimed in claim 1 in which the battery is a lead acid battery.

10. A battery as claimed in claim 1 in which the manifold is substantially rectangular.

11. A manifold assembly for a battery including a manifold and a double-sided adhesive gasket, one side of the double-sided adhesive gasket being adhered to the manifold and the other side of the double-sided adhesive gasket being covered with a release layer, the arrangement being such that the manifold may be fixed in position on a battery casing by removing the release layer and pressing the manifold onto the casing, thereby forming a seal between the manifold and the casing, wherein, in position, the manifold is arranged to collect gas emerging from vents of the battery, and wherein the manifold includes a spigot configured to enable gas in the manifold to be expelled therefrom.

12. A method of making a battery which includes the step of fixing a manifold to the battery casing using a double-sided adhesive gasket, wherein the step of fixing the manifold comprises the steps of applying a double-sided adhesive gasket having a release layer on one side to the manifold or to the casing, removing the release layer and applying the manifold to the battery casing, thereby fixing it in place and forming a seal between the manifold and the casing, wherein, in position, the manifold is arranged to collect gas emerging from vents of the battery, and wherein the manifold includes a spigot configured to enable gas in the manifold to be expelled therefrom.

13. A method as claimed in claim 12 in which the battery is a lead acid battery.

14. A battery formed by the method of claim 12.

15. A battery as claimed in claim 1 in which the manifold extends above a top surface of the casing.

* * * * *